2,905,558
FEED FOR ANIMALS

James William Adams, Schofield, Wis., assignor, by mesne assignments, to American Can Company, New York, N.Y., a corporation of New Jersey No Drawing. Application April 12, 1956
Serial No. 577,662

10 Claims. (Cl. 99—2)

This invention relates to a new fodder for domestic livestock. Particularly, this invention relates to a new food component to be added to the feed of domestic animals, including fowl. The feed component herein described can economically replace a portion of the more expensive ingredients of feed for cattle and poultry, such substitution resulting in increased milk production and improved general health of cattle, as well as increased rate of weight gain in poultry and decreased hen fatality.

The new feed component to which my invention refers is a product derived from the spent liquors resulting from the sulfite process for obtaining cellulose pulp from wood or similar plant materials. The spent liquors from the sulfite wood pulping process contain substantial amounts of lignosulfonates, sugars and incompletely hydrolyzed carbohydrates. Treatment of such liquors with lime in a multi-stage manner according to the Howard process disclosed in the United States reissued Patent 18,268, December 1, 1931, and in United States Patents No. 1,856,558, May 3, 1932, and 1,924,361, August 29, 1933, results in a precipitation of most of the lignosulfonates as basic calcium lignosulfonate, which may be removed from the liquor. At the same time, the treatment with lime results in the conversion of a large part of the carbohydrate components of the liquor to calcium salts of various sugar acids. These salts, together with that portion of the lignosulfonate note precipitated by the lime treatment, are present in the effluent liquor or tail liquor containing the carbohydrate components as described in the Howard patents. It is from this portion of the spent sulfite liquor that the valuable animal feed components referred to in this invention are recovered. The carbohydate derivatives mentioned above comprise about 60–70% of the organic material present in the tail liquor, the remainder being lignosulfonates not removed by the lime treatment.

It is an object of the present invention to provide a new feed component for domestic animals and fowl, which component is palatable, highly nutritious and economical, and is conducive to improvement in the general health and productive capacity of the animals fed therewith. It is a further object of the invention to produce such a feed component from the spent liquors of the sulfite pulping process for wood and other plant materials.

The procedure used for preparation of the desired feed component from the carbohydrate filtrate portion of spent sulfite liquor may be varied in certain respects in order to obtain a product most suitable for a particular feed use. For example, if the product is obtained primarily as calcium salts of the organic constituents, it has been found relatively less palatable to cattle than the corresponding sodium salts, or a mixture of sodium and calcium salts. On the other hand, the product prepared as calcium salts has been found very desirable for use in feed for poultry. Furthermore, a slight modification of the procedure may be employed, if desired, to increase the phosphorous content of the feed component. This modification, too, has been found desirable in the preparation of the feed component for poultry use. A detailed description of these modifications in the preparation procedure follows.

Spent sulfite liquor was treated with lime in a multi-stage manner according to the aforementioned Howard process to remove calcium sulfite and basic calcium lignosulfonate as insoluble materials. These materials were removed, and the carbohydrate filtrate liquor, now free of lime-precipitable lignosulfonates but containing applicable amounts of lime-unprecipitable lignosulfonates, treated according to one of the following examples.

*Example 1.*—Phosphoric acid was added to a pH of about 4.5, resulting in the precipitation of calcium phosphate. The resulting suspension was concentrated by evaporation of water and finally reduced to dryness, yielding a product containing 12.7% calcium and 3.3% phosphorus and substantially free of lime-precipitable lignosulfonates. This material, containing calcium phosphates as well as calcium salts of the various sugar acids and lignosulfonic acid, is a very satisfactory feed component, particularly for poultry. In later discussion this product, high in calcium and phosphorous content, will be referred to as Carbohydrate Product 1.

*Example 2.*—The carbohydrate filtrate liquor resulting from the aforementioned Howard process was treated with carbon dioxide to remove free lime as calcium carbonate. After removal of the precipitated calcium carbonate, the filtrate was concentrated and dried. The product obtained by this procedure was somewhat lower in calcium content than that previously described and is essentially free of phosphorous. It is comprised essentially of the calcium salts of the sugar acids and lignosulfonic acid. This product, hereinafter referred to as Carbohydrate Product 2, is a desirable component of poultry feed, but is sufficiently unpalatable to cattle to make its use in cattle feed less desirable than products prepared by procedures described later in this application.

*Example 3.*—The carbohydrate filtrate liquor resulting from the Howard process was treated with sulfuric acid to a pH of about 3.5, resulting in a precipitation of calcium sulfate, which was removed by filtration. The clarified acidic liquor was neutralized with caustic soda and the neutral liquor concentrated and dried. By this procedure, the sugar acids and lignosulfonates were obtained in the form of mixed sodium and calcium salts substantially free of lime-precipitable lignosulfonates. This product is satisfactory for inclusion in both cattle and poultry feeds. In later discussion, this material will be referred to as Carbohydrate Product 3.

*Example 4.*—The carbohydrate filtrate liquor resulting from the Howard process was treated with carbon dioxide to precipitate free lime as calcium carbonate and sufficient sodium carbonate was added to convert the calcium salts of the organic compounds present to sodium salts. After filtering to remove precipitated calcium carbonate, the filtrate was concentrated and dried. This product will be referred to in subsequent discussion as Carbohydrate Product 4. It contained the sodium salts of lignosulfonic acid and the various sugar acids substantially free of lime-precipitable lignosulfonates. This material is considerably more palatable to cattle than the corresponding product obtained as the calcium salts. It is also an excellent component of poultry feeds.

Extensive testing has been carried out on both the sodium and calcium salts obtained from the carbohydrate filtrate from spent sulfite liquor. Acute toxicity studies on white rats with Carbohydrate Product 3 indicated an LD-50 value of greater than 9 gm. per kilogram of body weight. Non-toxic properties of Carbohydrate Product 2 were shown in 6-week feeding tests on chicks, where experimental rations containing 0, 2.5, 5.0, 7.5 and 10 percent of the Carbohydrate Product 2 were fed to separate groups of chicks. Grain containing 0 and 5 percent Carbohydrate Product 4 was fed to groups of young Flemish giant rabbits for an eight week period with no adverse affects in weight gain or other characteristics. Carbohydrate Product 4 was also fed to a mature Holstein cow by incorporation of the test material in a grain supplement during a four month period. During this time, the percentage of Carbohydrate Product 4 in the feed was increased from 5% to 25% as shown in Table I, in which A, B, C, D and E were 200 lb. batches of feed, successively prepared and fed to the cow at about 10 lbs. per day.

TABLE I

*Carbohydrate product 4 in dairy cattle feeds*

| Supplement | A | B | C | D | E |
|---|---|---|---|---|---|
| | Parts | Parts | Parts | Parts | Parts |
| Oats | 73.5 | 69.5 | 65.5 | 61.5 | 57.5 |
| Soybean oil meal | 10.5 | 10.0 | 9.5 | 9.0 | 8.5 |
| Soybean meal | 10.5 | 10.0 | 9.5 | 9.0 | 8.5 |
| Mineral mixture | 0.5 | 0.5 | 0.5 | 0.5 | 0.5 |
| Carbohydrate Product 4 | 5.0 | 10.0 | 15.0 | 20.0 | 25.0 |
| Total amount consumed, pounds | 200 | 200 | 200 | 420 | 25 |

The supplement was palatable to the cow up to a concentration of 20% Carbohydrate Product 4. The amount of the 25% mixture consumed by the cow was found to be quite limited, so this batch was diluted back to a 20% concentration with grain and was then freely consumed by the cow. A total of 150 lbs. of Carbohydrate Product 4 was consumed by the cow with no ill effects.

A herd of 19 Holstein cows was fed supplement A, shown in Table I, above, containing 5% of Carbohydrate Product 4, during a two and one-half month period. Milk production was higher than normal during this period and the health of the herd remained excellent, whereas in the equivalent period of previous years milk production had been low due to the appearance of ketosis or acetonemia in the herd.

In another feeding test, Carbohydrate Product 3 was fed for the 180 days of the winter season to a total of 2144 cattle in 83 dairy herds. The Carbohydrate Product was added to grain feed to the extent of 1 to 5% by various of the cooperating dairy herd owners. A total of 88,833 lbs. of Carbohydrate Product 3 was consumed in this test. A majority of the herd owners reported that during the experimental period the cattle were in better health, had better appetites and produced more milk than in previous winters. Data on the incidence of ketosis, a non-infectious metabolic disturbance usually occurring in cattle after calving during the period of high milk production, indicated that the addition of Carbohydrate Product 3 to the diet during the winter months resulted in an 84% reduction in the incidence of the disease compared to records of the same herds from the previous year. Ketosis, in cattle, is accompanied by a loss in appetite and a drop in milk production, thus constituting a serious threat to the dairy farmers' income.

An experimental laying mash containing 6% of Carbohydrate Product 1 was fed to a flock of 38 hens over an 18 day period without detrimental effect to the health or egg-production of the flock. Accordingly, a control mash and an experimental mash containing 8% of Carbohydrate Product 1, as shown in the following Table II, were prepared and fed free choice with whole oats and water to a control group of 11 pullets and an experimental group of 12 pullets for a 23 week period.

TABLE II

*Composition of laying mashes*

| | Control Mash (pounds) | Experimental Mash (pounds) |
|---|---|---|
| Ground yellow corn | 29 | 25 |
| Ground oats | 34 | 34 |
| Alfalfa meal | 5 | 5 |
| Soybean oil meal | 20 | 20 |
| Meat scraps | 5 | 5 |
| Steamed bone meal | 2 | |
| Granite grit | 2 | 2 |
| Calcium carbonate | 2 | |
| Carbohydrate Product 1 | | 8 |
| Iodized salt | 1 | 1 |
| Fish oil (300D) | 0.5 | 0.5 |
| No. 58A Merck vitamin mix [1] | 0.05 | 0.05 |
| "C.C.C." trace mineral supplement [2] | 0.05 | 0.05 |
| Total | 100.6 | 100.6 |

[1] At one pound per ton, this supplement adds 2 g. riboflavin, 4 g. calcium panthothenate, 6 g. niacin, and 20 g. choline chloride.
[2] At one pound per ton, this supplement adds 0.015% manganese sulfate, 0.018% iron sulfate, 0.00052% copper sulfate, 0.00032% cobalt sulfate.

The results of this feeding test are summarized in the following Table III.

TABLE III

*Carbohydrate product 1 in laying hen rations*

| Group | Control | Experimental |
|---|---|---|
| Feature | Standard mash | Mash Contains 8% Carbohydrate Product 1 (no bone meal or CaCO₃) |
| No. hens at start of experiment | 11 | 12 |
| No. hens at end of experiment | 8 | 12 |
| Av. wt. of hens at 46 weeks, lbs | 5.86 | 6.21 |
| Av. wt. of hens at 50 weeks, lbs | 6.41 | 6.70 |
| Av. wt. of eggs at 46 weeks, grams | 54.97 | 54.95 |
| Av. wt. of eggs at 50 weeks, grams | 59.87 | 60.02 |
| Eggs/hen/week for 23-week period | 3.85 | 3.83 |

It will be noted from the data that the average weight of the experimental hens at the end of the test was somewhat highter than that of the control group and that egg production was unimpaired in either number or weight of eggs by incorporating Carbohydrate Product 1 in the mash. The general health of the experimental group was improved, as indicated by a comparison of the mortality rate of the two groups.

In a test of the value of Carbohydrate Product 1 in chick feeding, a control mash and an experimental mash containing 5% of Carbohydrate Product 1 were prepared as indicated in the following Table IV.

TABLE IV

Rations for experimental chick feeding

|  | Basal | |
|---|---|---|
|  | Pounds | Parts |
| Wheat bran | 50 | 4 |
| Wheat middlings | 50 | 4 |
| Dehydrated alfalfa meal | 50 | 4 |
| Soybean oil meal | 400 | 33.8 |
| Ground yellow corn | 600 | 50 |
| Iodized salt | 8 | 0.6 |
| Fish oil | 4 | 0.3 |
| Fish meal | 40 | 0.3 |
| "C.C.C." trace mineral premix [1] | 1 |  |
| No. 58A vitamin mixture Merck [2] | 0.5 |  |
| Pro-Pen feed supplement-Merck [3] | 1.5 |  |
| Total | 1,205.0 |  |

|  | Control, Pounds | Experimental, Pounds |
|---|---|---|
| Basal ration | 600 | 600 |
| Steamed bone meal | 15 |  |
| Calcium carbonate | 15 |  |
| Carbohydrate Product 1 |  | 30 |
| Total | 630 | 630 |

[1] "C.C.C." trace mineral premix at 1½ pounds per ton feed adds: 0.0226% manganese sulphate, 0.026% iron sulphate, 0.00078% copper sulphate, 0.000475% cobalt sulphate.
[2] No. 58A vitamin mixture Merck (each pound contains: 2 grams Riboflavin, 4 grams Calcium panthothenate, 6 grams Niacin, 20 grams Choline chloride).
[3] Pro-Pen (Merck) Vitamin B12 and antibiotic feed supplement. Each pound contains 3 milligrams Vitamin B12, 2 grams procaine penicillin.

The two mashes were fed to control and experimental groups of 50 (day-old) White Rock chicks for a 12 week period. Chicks fed the experimental growing mash ate 9% less feed and yet averaged 11% greater in weight at the end of the test. The data are summarized in the following Table V.

TABLE V

Carbohydrate product 1 in chick rations

| Group | Control | Experimental |
|---|---|---|
| Feature | Standard chick mash | Mash Contains 5% Carbohydrate Product 1 (no bone meal or CaCO₃) |
| Av. wt. of chicks at 6 weeks, lbs | 1.36 | 1.35 |
| Av. wt. of chicks at 12 weeks, lbs | 3.16 | 3.52 |
| Pounds feed/pound gain | 3.92 | 3.55 |

It is evident from the above examples that the feed prepared according to my invention, including a component isolated from spent sulfite liquor as previously described, is economical and nutritious for both ruminants and fowl. In my feed, I prefer to include from 1% to 25% by weight of the component isolated from spent sulfite liquor according to the processes herein described.

Having now shown and described several specific embodiments of my invention, it will be apparent that various modifications may be applied without departing from the spirit thereof. My invention, therefore, is not to be restricted except insofar as is necessitated by the prior art and the spirit of the appended claims.

I claim:

1. A foodstuff for domestic animals containing, together with other components of such food, a material comprising the mixture of sodium and calcium salts of lignosulfonic acid and wood sugar acids derived from spent sulfite liquor and substantially free of lime-precipitable lignosulfonates and inorganic calcium salts.

2. A foodstuff for domestic animals containing, together with other components of such food, a material comprising the sodium salts of lignosulfonic acid and wood sugar acids derived from spent sulfite liquor and substantially free of lime-precipitable lignosulfonates and calcium salts.

3. A foodstuff for domestic animals containing, together with other components of such food, a material comprising the calcium salts of lignosulfonic acid and wood sugar acids derived from spent sulfite liquor and substantially free of lime-precipitable lignosulfonates and inorganic calcium salts.

4. A foodstuff for poultry containing, together with other components of such food, a material comprising the phosphorus enriched calcium salts of lignosulfonic acid and wood sugar acids derived from spent sulfite liquor and substantially free of lime-precipitable lignosulfonates.

5. A feed for animals containing, together with other components of such feed, between 1% and 25% by weight of metal salts of lignosulfonic acids and wood sugar acids derived from spent sulfite liquor and substantially free of lime-precipitable lignosulfonates and inorganic calcium salts.

6. A feed for animals containing, together with other components of such feed, between 1% and 25% by weight of sodium salts of lignosulfonic acids and wood sugar acids derived from spent sulfite liquor and substantially free of lime-precipitable lignosulfonates and calcium salts.

7. A feed for domestic fowl containing, together with other components of such feed, between 1% and 25% by weight of the phosphorus enriched calcium salts of lignosulfonic acids and wood sugar acids obtained from spent sulfite liquor and substantially free of lime-precipitable lignosulfonates.

8. A food component for ruminant animals containing the product obtained from spent sulfite liquors, after removal of lime-precipitable basic calcium lignosulfonate and inorganic calcium salts, by neutralization of said liquor with caustic soda and evaporation of the neutral liquor containing mixed sodium and calcium salts of lignosulfonic acids and wood sugar acids to dryness.

9. A food component for ruminant animals comprising the mixed sodium and calcium salts of lignosulfonic acid and sugar acids obtained by addition of an excess of lime to spent sulfite liquor, filtering to remove solids comprising calcium lignosulfonate, acidifying the resulting filtrate with sulfuric acid, filtering to remove the precipitate comprising calcium sulfate, neutralizing the filtrate liquor with caustic soda and evaporating the neutral liquor to dryness.

10. A component of feed for poultry comprising the phosphorus enriched calcium salts of lignosulfonic acid and sugar acids obtained from spent sulfite liquor, after removal of lime-precipitable lignosulfonates, by acidification of said liquor with phosphoric acid and evaporation of the acidified liquor to dryness.

References Cited in the file of this patent

UNITED STATES PATENTS

| Re. 18,268 | Howard | Dec. 1, 1931 |
| 1,924,361 | Howard | Aug. 29, 1933 |

FOREIGN PATENTS

| 45,276 | Sweden | 1915 |